United States Patent [19]

Gale

[11] 4,419,014
[45] Dec. 6, 1983

[54] EXTRUDER MIXER

[75] Inventor: George M. Gale, Shrewsbury, England

[73] Assignee: Rubber and Plastics Research Association of Great Britain, Shrewsbury, England

[21] Appl. No.: 249,303

[22] Filed: Mar. 31, 1981

[30] Foreign Application Priority Data

Sep. 23, 1980 [GB] United Kingdom ............. 8030586

[51] Int. Cl.³ ............................................. B29B 1/06
[52] U.S. Cl. .................................. 366/99; 366/279; 366/307; 425/202; 425/209
[58] Field of Search .................. 366/79, 81, 82, 88, 366/89, 90, 98, 99, 97, 279, 307, 318, 279; 425/202, 209, 208; 264/176 R

[56] References Cited

U.S. PATENT DOCUMENTS

| | | | |
|---|---|---|---|
| 2,813,302 | 11/1957 | Beck | 264/176 R X |
| 3,174,185 | 3/1965 | Gerber | 366/99 |
| 3,593,379 | 7/1971 | Hendry | 366/82 |
| 4,253,771 | 3/1981 | Renk | 366/89 |

FOREIGN PATENT DOCUMENTS 787764 12/1957 United Kingdom .
841743 7/1960 United Kingdom .

OTHER PUBLICATIONS

*J. Colloid Sci.*, No. 6, Apr. 1951, pp. 133-145, Spencer, R. S. and Wiley, R. M.
*S.P.E. Antec 37th*, vol. 25, May 1979, pp. 241-244, Ng, K. Y. and Erwin, L.
*Kunstoffe*, 68, No. 1, 1978, pp. 12-19, Kramer, A.
122nd A.C.S. Rubber Division Meeting, Chi. Oct. 5-8, 1982, Paper No. 72, Johnson, P. S.

*Primary Examiner*—Philip R. Coe
*Assistant Examiner*—Joseph M. Pitko
*Attorney, Agent, or Firm*—Beveridge, DeGrandi and Kline

[57] ABSTRACT

An extruder mixer for the extrusion of molten plastics and rubbers. The apparatus comprises a hollow cylindrical stator member and a cylindrical rotor member rotatable within the stator. The facing cylindrical surfaces carry rows of hemispherical cavities extending peripherally around the members so that the rows of one member are axially offset from rows of the other member whereby there is an axial overlap of the cavities and rotor. The cavities in adjacent rows on the rotor and stator are also circumferentially offset.

7 Claims, 4 Drawing Figures

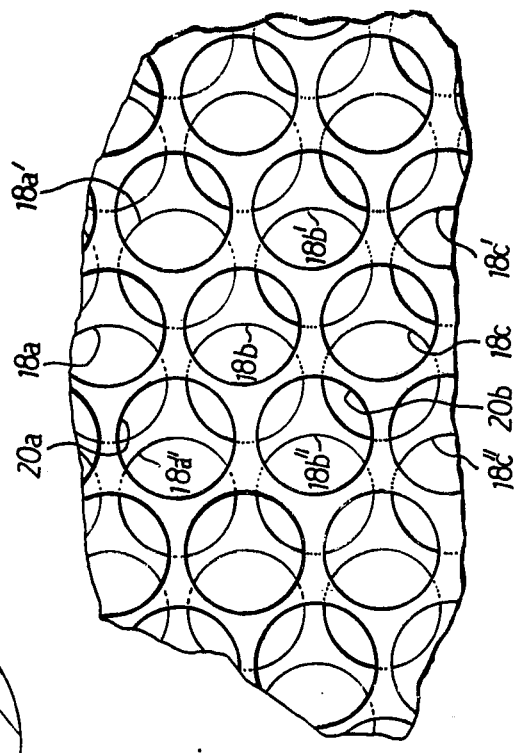
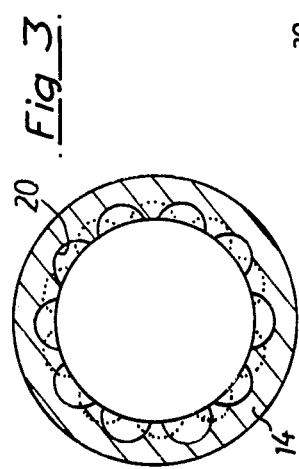
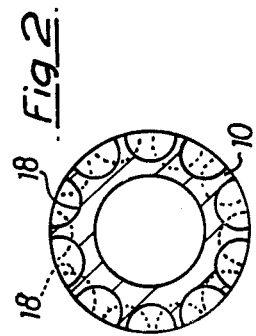

EXTRUDER MIXER

DESCRIPTION

The present invention relates to extruder mixers for the extrusion of molten plastics and rubbers and is particularly concerned with extruder mixers of the cavity-transfer type.

An example of a known cavity-transfer type extruder mixer is that disclosed in British Patent Specification No. 930 339 and includes a hollow cylindrical stator member and a cylindrical rotor member which is rotatable within the stator. The facing cylindrical surfaces on the rotor and stator carry respective pluralities of rows of elongate, longitudinally extending grooves. The rows of grooves on each member extend peripherally around the member and are spaced apart axially, the rows on one member being axially offset from the rows on the other member whereby there is axial overlap of the grooves in adjacent rows on the stator and rotor. By virtue of this arrangement of overlapping closed cavities on the rotor and stator, material progressing through this mixer has to travel in a path which alternates between rotor and stator cavities. Where a cavity on one member happens to be opposite a land on the other member the material is subjected to simple shear so that it is cut in half before being displaced approximately at right angles to its original direction as it passes into the next cavity. Another known machine of this type is described in British Patent Specification No. 1,475,216.

It has been found that, whereas such mixers operate satisfactorily when constructed on a small, laboratory scale, when scaled up to a large production size machine the efficiency of the mixer falls, a size limitation being reached where either the product is unsuitable or the added length necessary makes engineering complexity uneconomic. This is because the output rate per screw revolution of an extruder increases in proportion to the cubed power of the screw diameter whereas the available mixer area increases by only the square of the screw diameter if the length to diameter ratio of the mixer is kept constant.

If one attempts to increase the mixing capacity by making the cavities deeper then there is a risk of polymer stagnation and degradation occurring in the corners of the cavities.

It is an object of the present invention to provide an extruder mixer which enables large scale operation whilst reducing the problems of the known mixers outlined above.

In accordance with one aspect of the present invention this is achieved by forming the rotor and stator cavities as hemispheres arranged in a special configuration to give the required mixing characteristic.

By arranging the hemispherical cavities in parallel rows on the rotor and stator such that (i) the cavities in adjacent rows on the stator are circumferentially offset, (ii) the cavities in adjacent rows on the rotor are circumferentially offset and (iii) the rows of cavities on the stator and rotor are axially offset, an overall increase in mixing capacity for the same surface area can be obtained whilst achieving a desired exponential mixing characteristic in which simple shear mixing is repeatedly interrupted by cutting and turning stages.

Preferably, in the case of both the stator and the rotor, the circumferential offset is equal to half the circumferential distance between the centres of adjacent cavities in a row.

The axial offset of the stator and rotor rows is preferably equal to half the axial spacing between adjacent rotor or stator rows.

In accordance with a second aspect of the invention, in addition to the rows on the stator and rotor being axially offset, the cavities in each pair of adjacent rows on both the rotor and stator are circumferentially offset.

Preferably, the circumferential offset corresponds to half the centre spacing between adjacent cavities in a row and the axial offset is such that the adjacent edges of the cavity mouths in each pair of adjacent rows on the stator or rotor lie on or adjacent the centre line of the cavities in a row on the rotor or stator, respectively. By this arrangement, the cavities can be packed together so as to occupy about 60% or more of the respective stator and rotor surfaces and so as to increase the number of transfer points between the rotor and stator compared with known mixers and hence achieve better mixing. The resulting staggered formation achieves better mixing by dividing the melt streams, better transfer of material and hence higher output rate for the same pressure drop.

In accordance with a further aspect of the invention, the rotor and stator cavities all have circular mouths.

The invention is described further hereinafter, by way of example, with reference to the accompanying drawings, in which:

FIG. 2 is a transverse section through the rotor alone, taken along the line II—II in FIG. 1;

FIG. 3 is a transverse section through the stator alone taken along the line III—III in FIG. 1; and FIG. 4 is a developed view of part of the rotor and stator illustrating the axial offset of the rows of hemispherical depressions in the rotor and stator.

Figure 1:
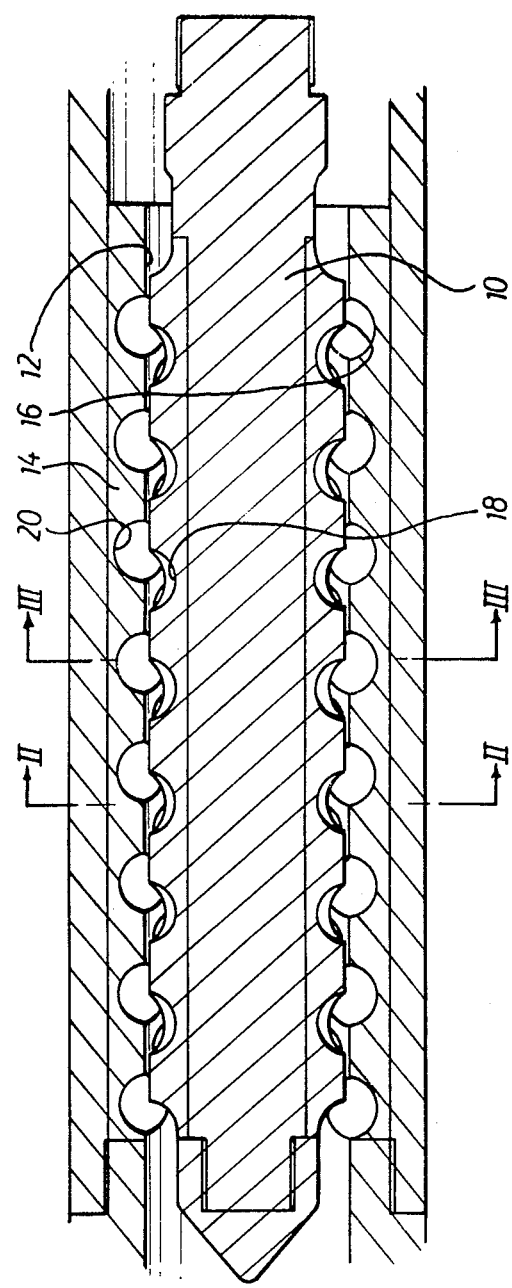
FIG. 1 is a longitudinal section through an assembled mixer in accordance with the present invention.

The illustrated mixer includes a rotor 10 which is rotatably mounted within a basically cylindrical bore 12 in a stator 14. The right-hand end of the rotor 10, as viewed in FIG. 1, is adapted to be keyed to the output end of a screw conveyor (not shown) and the left-hand end of the stator 14 is adapted to be attached to an extrusion die (not shown) whereby material being processed, e.g. polymer is forced between the rotor and stator in passing from the screw conveyor to the extrusion die. The arrangement described so far is conventional.

As shown in the drawings, the facing surfaces 16 and 12 on the rotor and stator are formed with respective pluralities of hemispherical cavities 18, 20. The cavities 18 on the rotor are disposed in a plurality of circumferentially extending rows. As indicated in FIG. 2, FIG. 3 and FIG. 4, adjacent rows on the rotor are circumferentially displaced such that the centre of each cavity in a given row lies midway between the centres of the two nearest cavities in the or each adjacent row. This can best be seen from the developed view of FIG. 4 where, for example, the circles 18a, 18b, 18c represent the cavities in one row on the rotor and the circles 18a', 18b', 18c' and 18a'', 18b'', 18c'' represent the cavities in the adjacent rotor rows. It will be noted that the circle identified as 18b is offset in the circumferential direction from the adjacent circles 18a' 18b' 18a'' and 18b'' by half the distance between the centres of any two adjacent cavities in a row, e.g. between the centres of the cavities 18a and 18b.

In a similar manner, the cavities 20 on the stator are disposed in a plurality of circumferentially extending rows, adjacent rows on the stator again being circumferentially displaced such that the cavities in a given row are offset by half the distance between the centres of any two adjacent cavities in a row.

In addition to the above described offset nature of the adjacent rows of cavities on the rotor and stator, the relative axial positions of the rows on the rotor and stator are also offset as best seen in FIG. 4, such that the circumferential line joining the centre of any given row of cavities on the stator lies in the same axial position as a circumferential line positioned midway between the two circumferential lines joining the centres of the cavities in the two adjacent rotor rows. Thus, for example, in FIG. 4 the centres of the stator cavities 20a, 20b lie on a circumferential line positioned midway between the circumferential line joining the centres of rotor cavities 18a'', 18b'', 18c'' and the circumferential line joining the centres of the rotor cavities 18a, 18b, 18c.

This arrangement results in several practical advantages compared with the originally described known arrangements. The mixing capacity for the same surface area is considerably increased compared with the initially described arrangements. The configuration of the hemispherical cavities can be arranged so that overlaps occur between three cavities at any given time so that extra mixing or blending is obtained by repeated division of the melt streams. The hemispherical shape gives excellent streamlining so that, for example, polymer stagnation will not occur and purging is efficient when polymer changes are made. The hemispherical cavities can be cut with a ball end milling cutter which makes machining comparatively simple. Polishing is also easy so that overall manufacturing costs are reduced. Removal of polymer from hemispherical cavities is comparatively easy, which reduces cleaning time of the mixer and therefore "downtime" in production situations.

Although illustrated as being purely hemispherical, the rotor and stator cavities can also be in the form of cylinders, or of radiussed cylinders, i.e. a cylindrical cavity having radiussed closed end, and cylinder and hemispheres, i.e. a cylindrical cavity having a hemispherical closed end. The cylindrical arrangement is not favoured, however, as it can give rise to dead spots where unmixed material can lodge. Other cavity configurations, such as diamond-shaped, are possible but it is preferred for the cavities to have circular mouths.

I claim:

1. In an extruder mixer of the type comprising a hollow cylindrical stator member and a cylindrical rotor member which is rotatable within the stator and wherein the facing cylindrical surfaces of the rotor and stator carry respective pluralities of rows of recesses, with the rows on each member extending peripherally around the member and being spaced apart axially so that the rows on one member are axially offset from the rows on the other member whereby there is axial overlap of the recesses in adjacent rows on the stator and rotor, the improvement wherein the rotor and stator recesses are in the form of hemispherical cavities, the hemispherical cavities being disposed with:
   (1) the cavities in adjacent rows on the stator circumferentially offset;
   (2) the cavities in adjacent rows on the rotor circumferentially offset; and
   (3) the rows of cavities on the stator and rotor axially offset.

2. An extruder mixer comprising a hollow cylindrical stator member, a cylindrical rotor member, means journalling the rotor for rotation within the stator, the facing cylindrical surfaces of the rotor and stator carrying respective pluralities of parallel rows of hemispherical cavities, the hemispherical cavities being disposed with:
   (1) the cavities in adjacent rows on the stator circumferentially offset;
   (2) the cavities in adjacent rows on the rotor circumferentially offset; and
   (3) the rows of cavities on the stator and rotor axially offset.

3. An extruder mixer according to claim 2 wherein in the case of both the stator and the rotor, the circumferential offset between the cavities in adjacent rows is equal to half the circumferential distance between the centres of adjacent cavities in a row.

4. An extruder mixer according to claim 3 wherein the axial offset of the stator and rotor rows is equal to half the axial spacing between adjacent rotor rows.

5. An extruder mixer comprising a hollow cylindrical stator member, a cylindrical rotor member, means journalling the rotor for rotation within the stator, the facing cylindrical surfaces of the rotor and stator carrying respective pluralities of parallel rows of hemispherical cavities, the rows of hemispherical cavities on the rotor and stator being axially offset and the hemispherical cavities in each pair of adjacent rows on both the rotor and stator being circumferentially offset.

6. An extruder mixer according to claim 5 wherein the circumferential offset corresponds to half the centre spacing between adjacent cavities in a row and the axial offset is such that the adjacent edges of the cavity mouths in each pair of adjacent rows on the stator/rotor lie on the centre line of the cavities in a row on the rotor/stator, respectively.

7. In an extruder mixer of the type comprising a hollow cylindrical stator member and a cylindrical rotor member which is rotatable within the stator, and wherein the facing cylindrical surfaces of the rotor and stator carry respective pluralities of rows of recesses, with the rows on each member extending peripherally around the member and being spaced apart axially so that the rows on one member are axially offset from the rows on the other member whereby there is axial overlap of the recesses in adjacent rows on the stator and rotor, the improvement wherein the rotor and stator recesses have circular mouths, the recesses being disposed with:
   (1) the recesses in adjacent rows on the stator circumferentially offset;
   (2) the recesses in adjacent rows on the rotor circumferentially offset; and
   (3) the rows of recesses on the stator and rotor axially offset.

* * * * *